(12) United States Patent
Steele

(10) Patent No.: US 8,052,906 B2
(45) Date of Patent: Nov. 8, 2011

(54) POLYAMIDE YARN PROCESS

(75) Inventor: Ronald E. Steele, Hixson, TN (US)

(73) Assignee: Invista North America S.à.r.l., Wilmington, DE (US)

( * ) Notice: Subject to any disclaimer, the term of this patent is extended or adjusted under 35 U.S.C. 154(b) by 1091 days.

(21) Appl. No.: 10/656,057

(22) Filed: Sep. 5, 2003

(65) Prior Publication Data

US 2004/0126581 A1 Jul. 1, 2004

Related U.S. Application Data

(60) Provisional application No. 60/410,984, filed on Sep. 16, 2002.

(51) Int. Cl.
*B28B 3/20* (2006.01)
*B29C 47/00* (2006.01)
*D02G 3/02* (2006.01)

(52) U.S. Cl. .................................. 264/176.1

(58) Field of Classification Search ............... 264/176.1, 264/211.14, 211.12, 39
See application file for complete search history.

(56) References Cited

U.S. PATENT DOCUMENTS

| | | | |
|---|---|---|---|
| 3,480,596 A | 11/1969 | Holmes | |
| 4,034,034 A * | 7/1977 | Eberius et al. | 264/39 |
| 4,952,345 A | 8/1990 | Rao et al. | |
| 6,235,390 B1 | 5/2001 | Schwinn et al. | |

FOREIGN PATENT DOCUMENTS

| | | |
|---|---|---|
| EP | 0 098 616 | 1/1984 |
| WO | WO 00/26448 A1 | 5/2000 |

OTHER PUBLICATIONS

Fourne, Synthetic Fibers, Chapter 4, p. 359, C. Hanser Publishers, Munich 1998.

* cited by examiner

*Primary Examiner* — Christina Johnson
*Assistant Examiner* — Patrick Butler
(74) *Attorney, Agent, or Firm* — Christina W. Geerlof

(57) ABSTRACT

A process for making a synthetic melt spun polyamide filament in a solid phase polycondensation apparatus is disclosed. The flow rate of the purge (make-up) gas to the apparatus is increased, and the overall pressure in the apparatus is decreased, as compared to solid phase polycondensation apparatus of the prior art. As a result, the removal of the thermal degradation impurity from the polymer flake contributes to improving the yarn quality and at the same time, extends the spinneret wipe life.

6 Claims, 5 Drawing Sheets

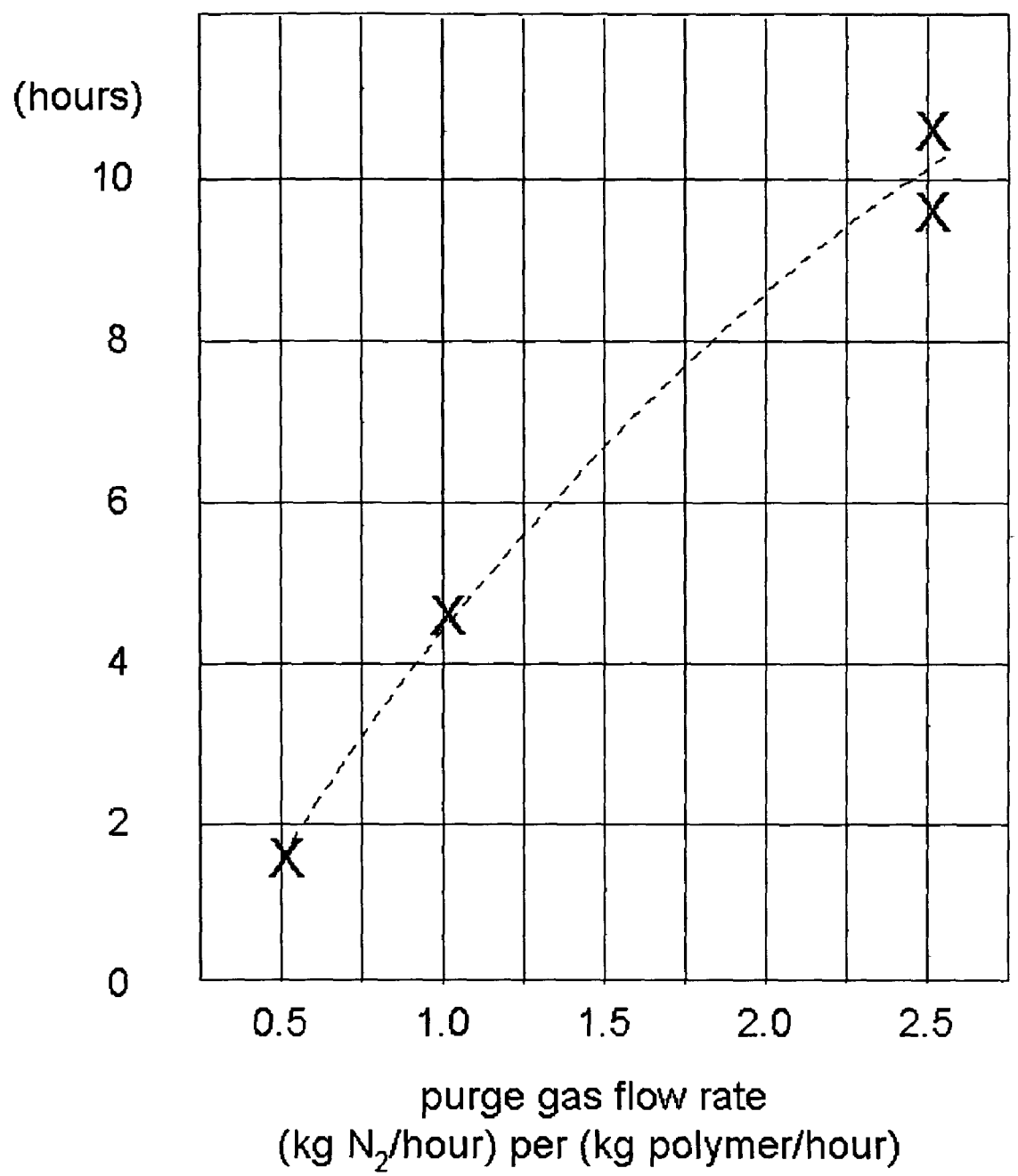

POLYAMIDE YARN PROCESS

BACKGROUND OF THE INVENTION

This invention relates to an improved process for production of polyamide yarns and to an improved polyamide yarn for use in apparel applications.

More particularly the invention relates to an improved process for spinning polyamide yarns using a polymer flake (also called polymer chips or granulate) remelting process. In many prior art polymer flake remelt processes a solid phase polymerizer is used to build the polymer relative viscosity (RV) to a higher level for spinning yarns of higher tenacity and toughness. Yarn quality is directly affected by its tenacity and toughness providing a product which is more widely acceptable in variety of apparel applications.

In U.S. Pat. No. 4,952,345; Rao et al. disclose a control method to use a solid phase polymerizer or SPP (also known as a solid phase polycondensation apparatus) with a polyamide flake remelt process to build the polymer RV in a highly uniform and reproducible way. In U.S. Pat. No. 6,235,390; Schwinn et al. disclose an SPP method and apparatus for building very high RV polyamide polymer filaments by treating the polymer before extrusion with a very low dew point gas. While these prior means to build polymer RV and control the polymer RV to highly uniform value, neither means address the problems problem of process interruptions and fundamental spinning process productivity.

In the manufacture of polyamide yarns, especially nylon 66 yarns, the winding of the yarn is stopped frequently to remove undesirable deposits found around the capillary exit side of the spinneret plate. If not removed these deposits build up to a thickness of a "few millimeters (per) week" according to Fourné (*Synthetic Fibers*, Chapter 4, page 359, C. Hanser Publishers, Munich 1998.) Such deposits cause the filaments to bend or "knee." Bending of a majority of the filaments, if not remedied, ultimately leads to filaments breaks, yarn defects or unscheduled process interruptions. Increasing numbers of process interruptions especially, lead to the yarn spinning process becoming less efficient.

The problem of bent filaments tends to increase with increasing filament delusterant content. Titanium dioxide ($TiO_2$) is a commonly employed delustering pigment. A $TiO_2$ content in the range of 0.03 to about 1.0 per cent by weight in the polyamide polymer provide so-called bright to mid-dull luster in to the filaments. However, a $TiO_2$ content in the range of greater than 1 to about 3 per cent by weight in the polyamide polymer provide dull or "fully dull" luster filaments, desirable in many apparel applications. It is dull luster filament yarns which tend to present more process problems relating to bent filaments.

For a polyamide yarn manufacturing process the cleaning the spinneret plate on the capillary exit face is often referred to in the art as "spinneret wiping." The time between spinneret wiping events, where each event is necessitated by a build up of the undesirable deposits, is called the wipe cycle time or wipe life. A longer spinneret wipe cycle, the time between cleaning the spinneret face, is more desirable. Means to increase this time needed between spinneret wiping events, the wipe cycle, and in turn the productivity of the a polyamide yarn spinning process; have been sought for many years. There has been a long felt need in the art to provide a polyamide yarn spinning process of higher productivity. While it has been known to those skilled in the art that reducing the numbers of filament breaks, yarn quality defects and unscheduled process interruptions has a direct effect on productivity, means to leverage or remedy such defects have been heretofore elusive.

With this objective in mind, other objects of the invention will be clear from the following description.

SUMMARY OF THE INVENTION

The present invention overcomes the problems of the prior art by increasing the flow rate of the purge (make-up) gas and lowering the overall pressure in the SPP makes the removal of thermal degradation products more favorable. As a result, the removal of this thermal degradation impurity from the polymer flake contributes to improving the "Yarn Quality" and at the same time it extends the spinneret wipe life.

In order to achieve the objects of the present invention, there is provided an improved process for production of polyamide yarns for use in apparel applications, comprising:
  supplying polyamide polymer containing about 1 to about 3.5 per cent by weight TiO2 to a solid phase polycondensation apparatus;
  supplying a purge gas, comprised of nitrogen and water vapor, to the solid phase polycondensation apparatus at a rate in the range of about 2 to about 3 kg/hour per kg of polyamide polymer per hour;
  treating the polyamide polymer in the solid phase polycondensation apparatus with the purge gas,
  conveying the treated polyamide polymer to a melt extrusion apparatus;
  melting the polyamide polymer in the melt extrusion apparatus;
  extruding the melted polyamide polymer through a spinneret plate; and
  forming at least one continuous filament of polyamide polymer.

In another aspect, the invention is directed to synthetic melt spun polyamide filament comprising:
  a synthetic polyamide polymer pre-treated in a solid phase polycondensation apparatus at a system pressure in the range of about 100 to about 125 kPascal (14.7-18 pounds per inch$^2$ absolute), and especially about 115 kPascal (16.5 pounds per inch$^2$ absolute), with a purge gas;
  the treated polyamide polymer also containing a delustering pigment; and
  where the synthetic melt spun polyamide filament has a yarn quality greater than about 32.8.

BRIEF DESCRIPTION OF THE DRAWINGS

FIG. 1*a*. represents a relationship between the time to 10% bent filaments and purge gas flow in the SPP apparatus.

DESCRIPTION OF THE PREFERRED EMBODIMENTS

Figure 1B:
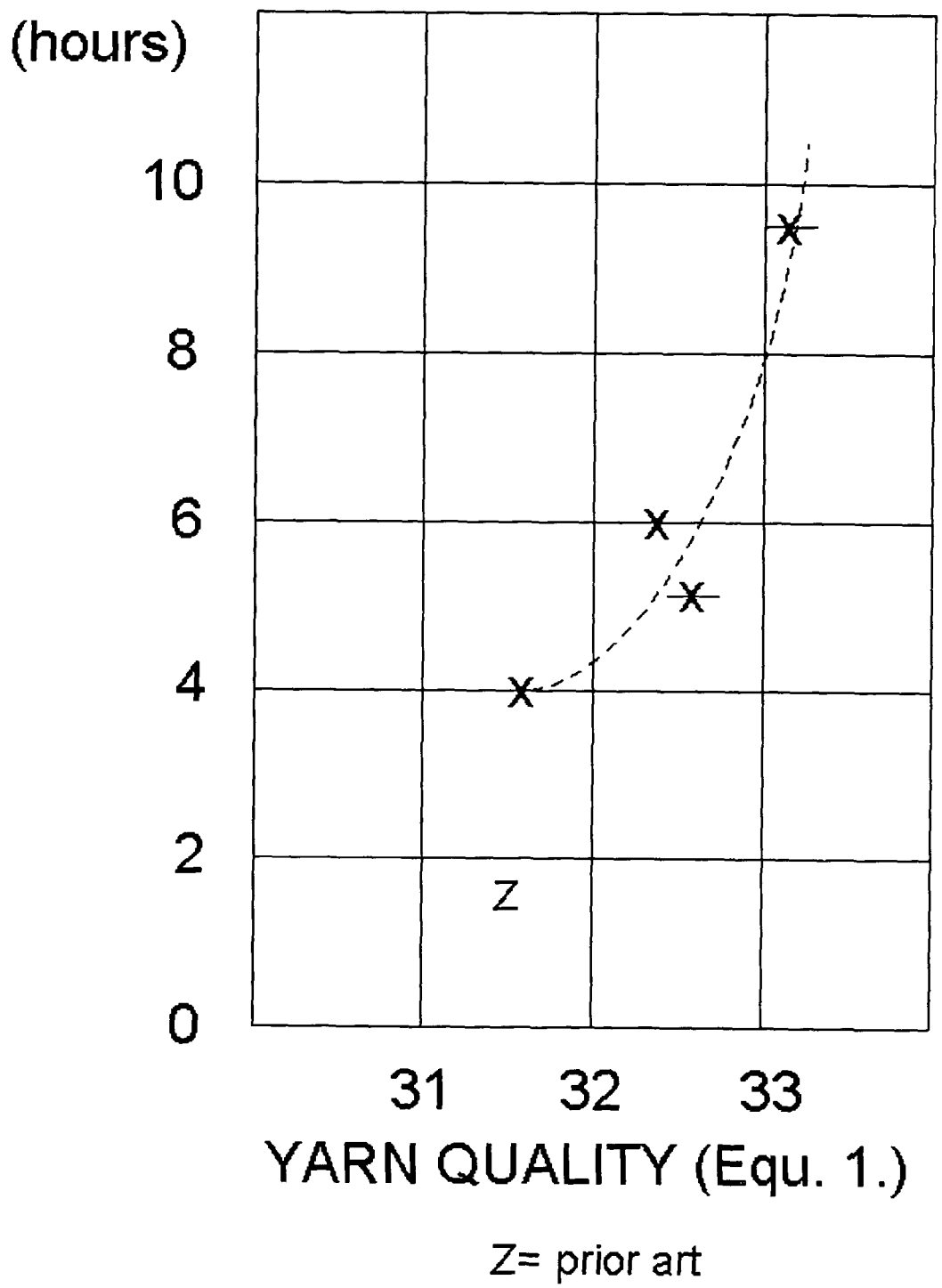
FIG. 1*b*. represents a relationship between the time to 10% bent filaments and yarn quality.

Throughout the following detailed description, similar reference characters refer to similar elements in all drawings or figures.

The invention is directed to an improved process for spinning polyamide yarns using a polymer flake remelting process with an SPP apparatus. The process improvement is characterized by an increase in the time between required spinneret plate wiping events. As a result, the improved process is characterized by an improvement in productivity of the polyamide yarn.

The invention is also directed to an improved dull luster polyamide yarn with a "Yarn Quality" derived from the yarn tenacity and elongation. Yarn quality is an estimate of the area under the stress-strain curve, indicative of the yarn "toughness"; as is known to those skilled in the art. The yarn quality improvement provides an apparel polyamide yarn which is more acceptable in varied applications. These applications may include, without limitation, warp knit fabrics, circular knit fabrics, seamless knit garments, hosiery products and light denier technical fabrics.

DETAILED DESCRIPTION

Figure 2A:
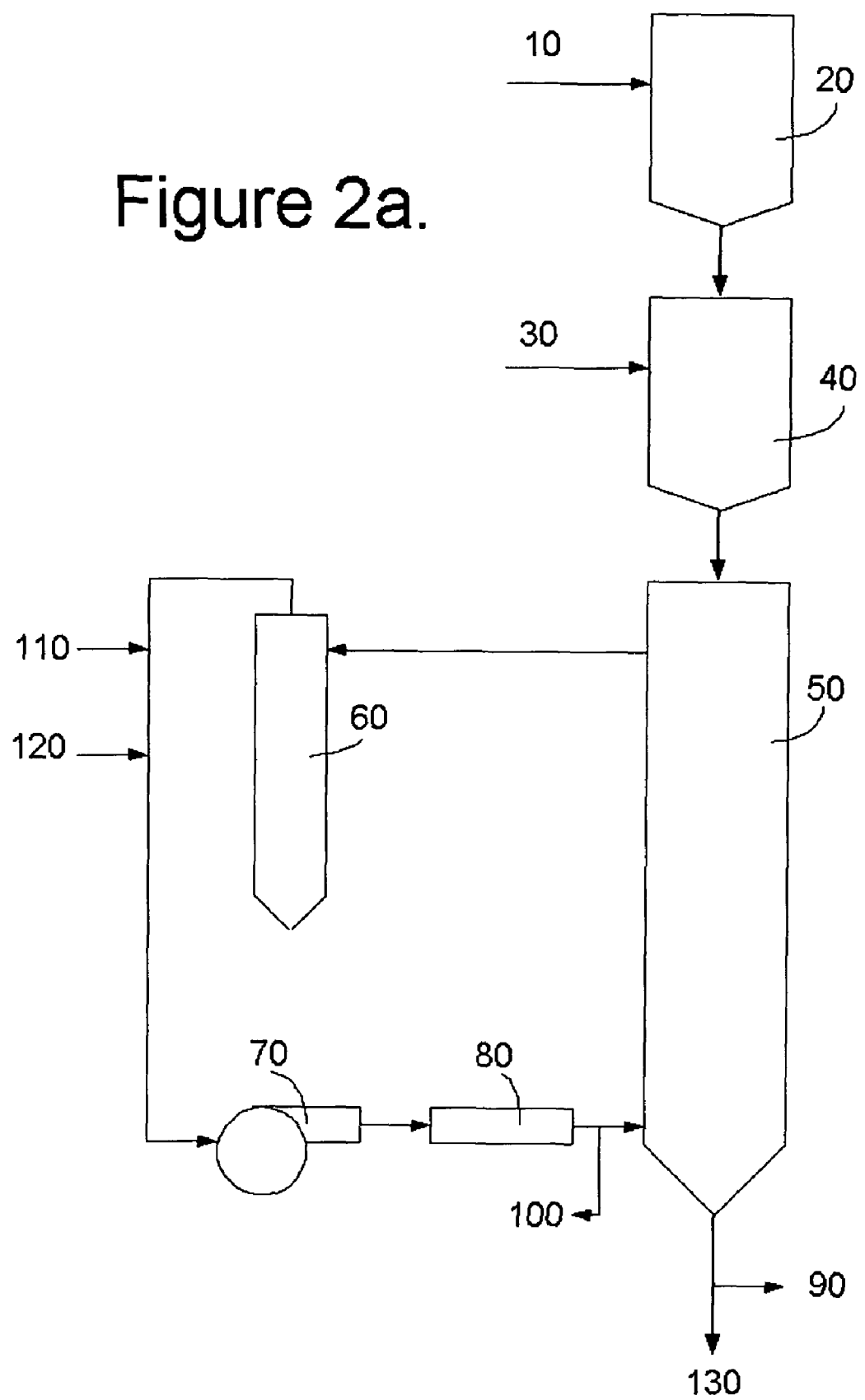
FIGS. 2*a*. and 2*b*. together provide a representation of the SPP apparatus and the melt spinning process.
Figure 2B:
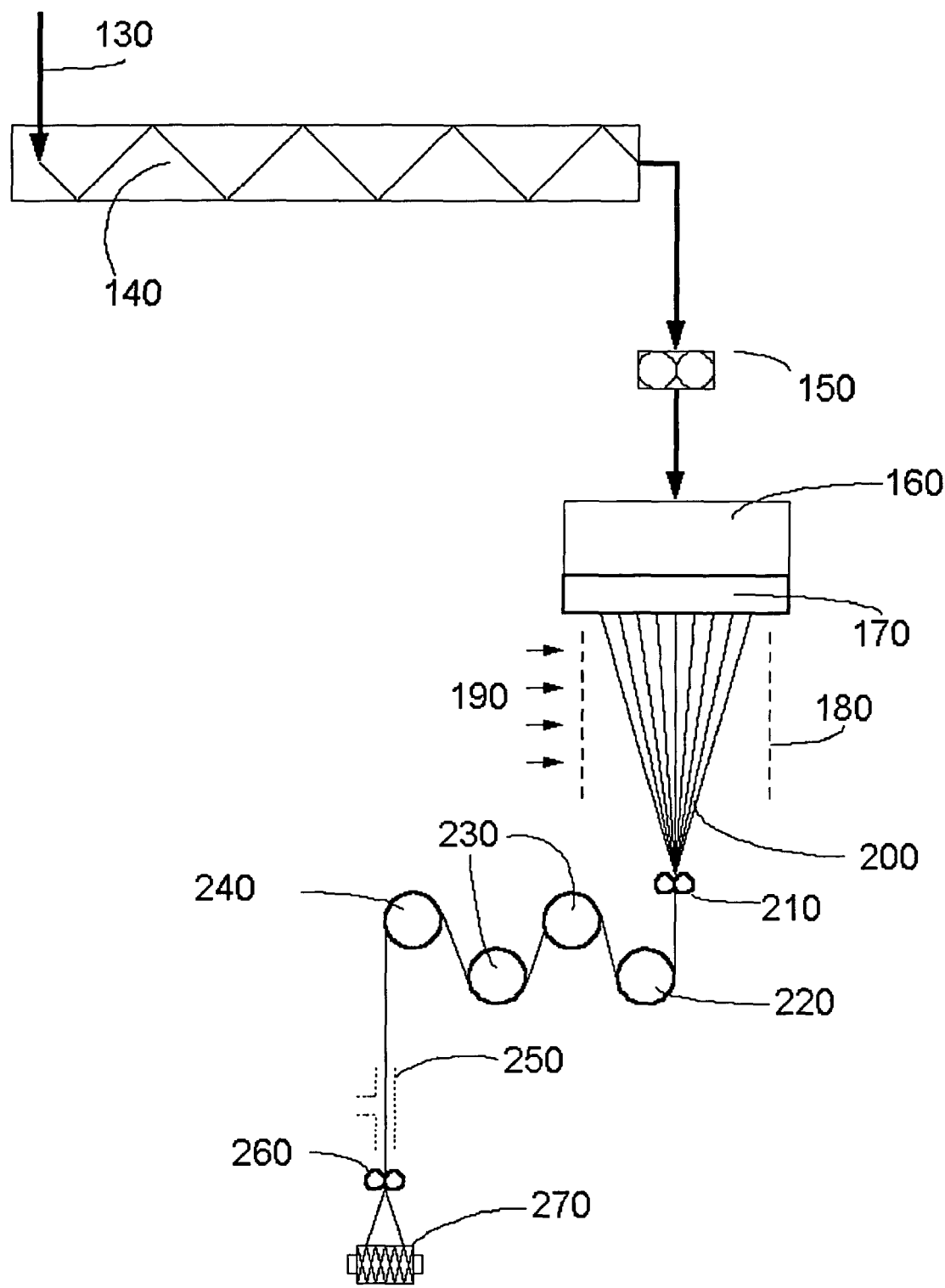
Figure 3A:
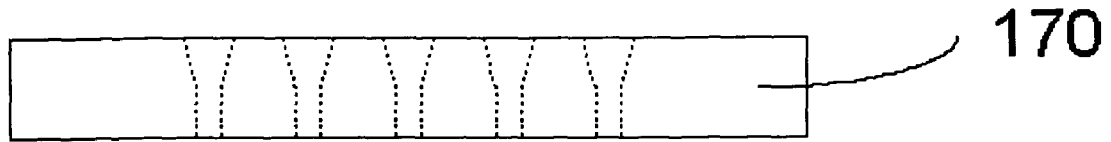
FIG. 3*a*. is a side elevation representation of a spinneret plate.
Figure 3B:
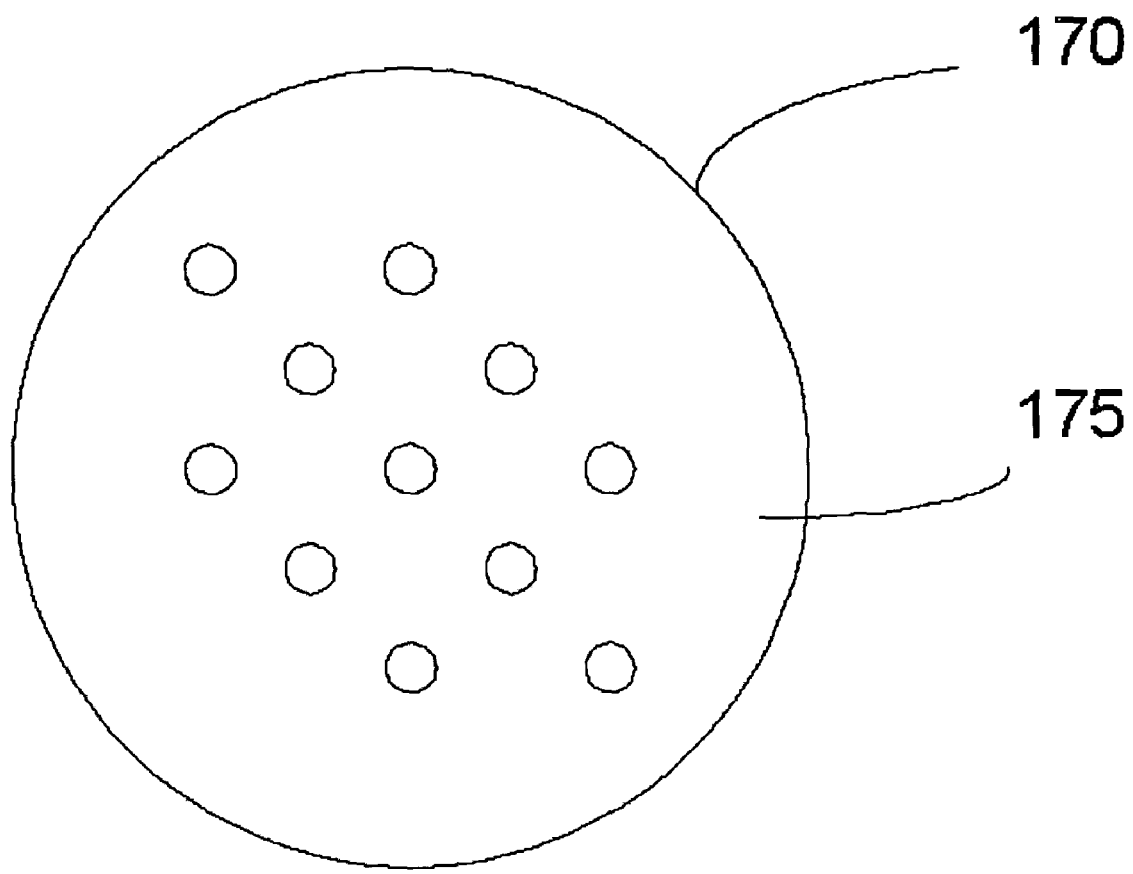
FIG. 3*b*. is a plan view representation of a spinneret plate.

In FIGS. 2a and 2b, the overall process of solid phase polymerization (SPP), polymer flake melting and synthetic fiber melt spinning from the polymer is represented. In FIG. 2a the polymer flake is introduced at 10 to a receiver vessel 20 and conveyed to a supply vessel 40 where a dry nitrogen purge gas, also called the makeup gas, is introduced at 30 at a flow rate of about 2 to about 3 kg per hour per kg of polymer flake per hour. The polymer flake, typically with an RV of about 36 to about 38, is conveyed to the SPP vessel 50 and additionally treated with nitrogen gas, optionally introduced at 110, along with water vapor introduced at 120. The nitrogen gas, so humidified with water vapor, is circulated by a blower 70 and heated to a controlled temperature at 80 and allowed to contact the polymer flake in the SPP vessel 50. Several vent ports (100 and 90) are provided to control the overall pressure in the SPP vessel 50 which may be controlled at a pressure above atmospheric pressure (101 kPascal); for example from about 110 to about 123 kPascal. The circulating nitrogen gas and water vapor, all at an elevated temperature within the range of 1200 to 220° C. and more preferably in the range 150° to 190° C., promote the uniform increase in polymer molecular weight as measured by the polymer relative viscosity RV. The polymer treated in the SPP, now with an RV in the range of 50 to 53, is conveyed through port 130 into the barrel of a melt extruder 140 in FIG. 2b. The polymer melts in the extruder and is forced into a meter pump 150 where the melted polymer is fed at a controlled rate to a spinning filter pack 160 and subsequently to a spinneret plate 170. The spinneret plate 170 contains a plurality of shaped passages or capillaries which correspond to the formation of each individual filament comprising the yarn (as represented in side elevation by FIG. 3a and plan view by FIG. 3b.). The individual filaments 200 are cooled in a quench cabinet 180 with a side draft of conditioned air 190 and converged and oiled with a primary finish, known in the art, at 210 into a yarn. The yarn is forwarded by feed roll 220 onto a draw roll pair 230 where the yarn is stretched and oriented to form a drawn yarn which is directed by roll 240 into a yarn stabilization apparatus 250, commonly used in the art and here optionally employed as a yarn posttreatment step. Finally, the yarn is wound up as a yarn package at 270, at a yarn speed in the range of 4000 to 6000 meters per minute. The yarn RV measured is about 51 to about 54. During the course of winding at these speeds any need to interrupt the process for the purpose of cleaning the exit side face of the spinneret plate dramatically affects the productivity. Essentially all product which could have been wound up is sent to waste while the spinneret plate is wiped.

The yarn produced according to the process represented by FIGS. 2a and 2b is a drawn yarn with elongation of 22 to about 60%, the boiling water shrinkage is in the range of 3 to about 10%, the yarn tenacity is the range of 3 to about 7 grams per denier, and the RV of the yarn can be varied and controlled well within a range of about 40 to about 60. A derived parameter characterizing the superior properties of this yarn is called the Yarn Quality and found by the product of the yarn tenacity (grams per denier) and the square root of the % elongation, as in Equation 1.

$$\text{YARN QUALITY} = \text{tenacity} \times (\text{elongation})^{1/2} \quad \text{Equation 1.}$$

The Yarn Quality is an approximation to the measure of yarn "toughness." As is known to those skilled in the art, the area under the yarn load elongation curve is proportional to the work done to elongate the yarn. Where tenacity is expressed in terms of force per unit denier, for example, and the elongation expressed as a per cent change per unit of length, the load elongation curve is the stress-strain curve. In this case the area under the stress-strain curve is the work to extend the yarn or the yarn toughness.

Surprisingly, it was found that enhanced yarn toughness and an extension of the time needed between spinneret wiping is a function of certain modifications to the process of operating the SPP. Increasing the nitrogen purge gas rate from about 0.5 kilogram/hour per kilogram of polymer per hour to about 2.5 kilogram/hour per kg of polymer per hour extends the spinneret wipe life of a 40 denier 13 filament nylon 66 dull yarn (1.5% $TiO_2$) from about 1.5 hours to about 10 hours; shown in FIG. 1a. A significant concurrent observation is that that lowering the SPP system pressure further aids in extending wipe life. Decreasing the system pressure from about 121 kPascal (17.5 pounds per square inch) to about 114 kPascal (16.5 pounds per square inch) reduced the wipe frequency from approximately 6 hours to 10-11 hour range in the initial test on a 40 denier 13 filament dull yarn; shown by FIG. 1b. In each case, the spinneret wipe life is determined as the time for 10% of all single filaments in the yarn bundle to appear bent at the exit side of the capillary on the spinneret plate face (175 in FIG. 3b.). Measuring the time to 10% bent filaments was performed directly by observation and a direct count by an operator illuminating the spinneret plate face within the quench cabinet.

While the inventors expect not to be held to any particular mechanism for how the invention works, it is felt that the hot and humid nitrogen atmosphere, due to added water vapor, in the SPP apparatus is extracting a degradation product of polyamide solid phase polymerization. Such a product of thermal degradation may readily react with water at the elevated temperature of the nitrogen recirculating gas atmosphere and become volatile enough to be removed through the normal purge process, via the vent ports of the SPP. If these thermal degradation products were not removed, it is hypothesized that a dimer is formed which is carried with the polymer and contributes to the deposits around the spinneret capillary exit face. It is these deposits which are removed in the wiping operation. It is felt that increasing the flow rate of the purge (make-up) gas and lowering the overall pressure in the SPP makes the removal of thermal degradation products more favorable. As a result, it appears that the removal of this thermal degradation impurity from the polymer flake contributes to improving the "Yarn Quality" (defined by Equation 1.) and at the same time it extends the spinneret wipe life by lessening the amount of thermal deposits. This also extends the time between wipe cycles.

TEST METHODS

Yarn tenacity and the yarn elongation are determined according to ASTM method D 2256-80 using an INSTRON tensile test apparatus (Instron Corp., Canton, Mass., USA 02021) and a constant cross head speed. Tenacity is expressed as grams of force per denier, the elongation percent is the increase in length of the specimen as a percentage of the original length at breaking load.

Yarn Quality derived from tenacity and elongation and is calculated according to Equation 1.

Polymer relative viscosity RV is measured using the formic acid method according to ASTM D789-86.

EXAMPLES

Example 1

The spinneret wipe life was investigated as a function of the nitrogen purge gas (make-up gas) flow rate by spinning a yarn of 40 denier (44 dtex) and 13 filaments. First, a nylon 66 polymer of 37.5 RV which contained 1.5% by weight TiO2 in was treated in an SPP with nitrogen purge gas (make-up gas) at flow rates of 0.5, 1.0 and 2.5 (kg $N_2$/hour) per (kg of polymer/hour) all at a constant SPP system pressure of 114 kPascal (16.5 pounds per square inch). The treated polymer had an RV of 51.5 was melted in an extruder and fed to a spinning machine which was used to prepare the 40-13 yarn, by a process of quenching in conditioned air, converging and treating the yarn with a primary spinning oil, drawing the yarn using unheated godets, stabilizing the yarn with a heated fluid, interlacing the yarn and winding on at a speed of about 5300 meters per minute. During the course of preparing the example yarns (A, B and C) the spinneret plate 170 on the capillary exit face (175 represented in plan view by FIG. 3*b*.) required wiping when at least 10% of the filaments were bent. The data for 4 trials is shown in Table 1 and plotted in FIG. 1*a*.

TABLE 1

| Sample | N2 flow rate (kg $N_2$/hour) per (kg of polymer/hour) | Total SPP pressure (kP) | Time (hours) to 10% bent filaments by direct observation and count |
|---|---|---|---|
| A | 0.5 | 114 | 1.5 |
| B | 1.0 | 114 | 5 |
| C (duplicate) | 2.5 | 114 | 10 (averaged) |

Example 2

In an example of the invention, a yarn of 40 denier (44 dtex) and 13 filaments was prepared by treating a nylon 66 polymer of 37.5 RV which contained 1.5% by weight TiO2 in an SPP with nitrogen purge gas (make-up gas) at flow rate of 2.5 (kg $N_2$/hour) per (kg of polymer/hour) all at a constant SPP system pressure of 114 kPascal (16.5 pounds per square inch). The treated polymer had an RV of 51.5 was melted in an extruder and fed to a spinning machine which was used to prepare the 40-13 yarn, by a process of quenching in conditioned air, converging and treating the yarn with a primary spinning oil, drawing the yarn using unheated godets, stabilizing the yarn with a heated fluid, interlacing the yarn and winding on at a speed of about 5300 meters per minute. During the course of preparing the example yarns the spinneret plate 170 on the capillary exit face (175 represented in plan view by FIG. 3*b*.) required wiping each 10 hours of yarn winding since at least 10% of the filaments were bent. The RV, the tenacity and elongation of the wound up 40-13 yarn was measured. The RV was 52.5. The tenacity and elongation measurements were used to calculate a "yarn quality" parameter using Equation 1. The parameter is related to the yarn toughness or work needed to draw the yarn and found here to be 33.1.

Example 3

The spinneret wipe life was investigated as a function of the total pressure in the SPP apparatus by spinning a yarn of 40 denier (44 dtex) and 13 filaments. First, a nylon 66 polymer of 37.5 RV which contained 1.5% by weight TiO2 in was treated in an SPP with nitrogen purge gas (make-up gas) at a flow rate of 2.5 (kg $N_2$/hour) per (kg of polymer/hour) and varying the SPP system pressure from 114 kPascal (16.5 pounds per square inch), to 121 kPascal (17.5 pounds per square inch), and finally to 128 kPascal (18.5 pounds per square inch). The treated polymer had an RV of 51.5 was melted in an extruder and fed to a spinning machine which was used to prepare the 40-13 yarn, by a process of quenching in conditioned air, converging and treating the yarn with a primary spinning oil, drawing the yarn using unheated godets, stabilizing the yarn with a heated fluid, interlacing the yarn and winding on at a speed of about 5300 meters per minute. During the course of preparing the example yarns (A, B, C and D) spinneret plate 170 on the capillary exit face (175 represented in plan view by FIG. 3*b*.) required wiping when at least 10% of the filaments were bent. The data for 4 trials is shown in Table 2 and plotted in FIG. 1*b*. (the points denoted by X).

TABLE 2

| Sample | Tenacity (grams per denier) | Elongation (percent) | "Yarn Quality" (Equation 1.) | Time (hours) 10% bent filaments |
|---|---|---|---|---|
| A | 4.87 | 46.38 | 33.2 | 9.5 |
| B | 4.83 | 45.04 | 32.4 | 6 |
| C | 4.79 | 43.53 | 31.6 | 4 |
| D | 4.69 | 48.44 | 32.6 | 5 |

Comparative Example 1

In a comparative example of the prior art, a yarn of 40 denier (44 dtex) and 13 filaments was prepared by treating a nylon 66 polymer of 37.5 RV which contained 1.5% by weight TiO2 in an SPP with nitrogen purge gas at a flow rate of 0.5 (kg $N_2$/hour) per (kg of polymer/hour) gas volume in the SPP at a system pressure of 121 kPascal (17.5 pounds per square inch). The treated polymer (51.5 RV) was melted in an extruder and fed to a spinning machine which was used to prepare the 40-13 yarn, by a process of quenching in conditioned air, converging and treating the yarn with a primary spinning oil, drawing the yarn using unheated godets, stabilizing the yarn with a heated fluid, interlacing the yarn and winding on at a speed of about 5300 meters per minute. During the course of preparing the example yarn the spinneret plate on the capillary exit required wiping each 1.5 hours of yarn winding, since at least 10% of the filaments were bent. The tenacity and elongation of the wound up 40-13 yarn was measured exactly as in the example of the invention. The measured RV was of this yarn was 52.5 RV as before. The tenacity and elongation were used to calculate a "yarn quality" parameter, which was found to be 31.5 using Equation 1.

The data from Example 3 (points denoted by X) and Comparative Example 1 (a point denoted by Z) are plotted in FIG. 1*b*; the time to 10% bent filaments versus the yarn quality (Equation 1). It can be seen that it is most desirable to have a low total system pressure in the SPP, ca. 114 kPascal and to have a high nitrogen gas purge flow rate, ca. 2.5 (kg $N_2$/hour) per (kg of polymer/hour) in order to provide a yarn of sufficiently high yarn quality or toughness and to have at the same time a longer spinneret wipe cycle; as shown by the time to 10% bent filaments.

As a result of these modifications to the operation of the SPP apparatus an increased productivity spinning process is realized. Most importantly, the need to interrupt the process continuity is reduced to about 2 times per 24 hour period from that of 6 or more times per 24 hour period. Furthermore, a yarn of higher "quality" (toughness) is obtained compared with the prior means of operating the SPP apparatus and spinning system.

What is claimed is:

1. A process for making a synthetic melt spun polyamide filament comprising the steps of:
   supplying polyamide polymer with an RV of 36 to 38 to a solid phase polycondensation apparatus;
   humidifying a purge gas with water vapor;
   supplying said purge gas to the solid phase polycondensation apparatus at a flow rate in the range of about 2 to about 3 kg/hour per kg of polymer per hour;
   treating the polyamide polymer in the solid phase polycondensation apparatus with the purge gas at a solid phase polycondensation system pressure of about 110 to about 120 kPascal;
   conveying the treated polyamide polymer to a melt extrusion apparatus;
   melting the polyamide polymer in the melt extrusion apparatus;
   extruding the melted polyamide polymer through a spinneret plate; and
   forming at least one continuous filament of polyamide polymer with a yarn RV of about 51 to about 54.

2. The process of claim 1, further including quenching and cooling the filament.

3. The process of claim 2, further including post-treating the filament and winding up the filament.

4. The process of claim 3, further including wiping the spinneret plate on the capillary exit side, in cycles, wherein each wiping cycle is separated by about 8 to about 12 hours.

5. The process of claim 1 wherein the purge gas is comprised of nitrogen gas supplied at a flow rate in the range of about 2 to about 3 kg/hour per kg of polymer per hour.

6. A process for making a synthetic melt spun polyamide filament comprising the steps of:
   supplying polyamide polymer with an RV of 36 to 38 to a solid phase polycondensation apparatus;
   treating a nitrogen comprising purge gas with water vapor,
   supplying said purge gas to the solid phase polycondensation apparatus at a flow rate in the range of about 2 to about 3 kg/hour per kg of polymer per hour;
   treating the polyamide polymer in the solid phase polycondensation apparatus with the purge gas at a solid phase polycondensation system pressure of about 110 to about 120 kPascal;
   conveying the treated polyamide polymer to a melt extrusion apparatus;
   melting the polyamide polymer in the melt extrusion apparatus;
   extruding the melted polyamide polymer through a spinneret plate; and
   forming at least one continuous filament of polyamide polymer with a yarn RV of about 51 to about 54.

* * * * *